(12) United States Patent
Wakamiya

(10) Patent No.: US 9,594,522 B2
(45) Date of Patent: Mar. 14, 2017

(54) BACKUP METHOD AND INFORMATION PROCESSING APPARATUS

(71) Applicant: FUJITSU LIMITED, Kawasaki-shi (JP)

(72) Inventor: Kenji Wakamiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 530 days.

(21) Appl. No.: 13/762,683

(22) Filed: Feb. 8, 2013

(65) Prior Publication Data

US 2013/0159650 A1 Jun. 20, 2013

Related U.S. Application Data

(63) Continuation of application No. PCT/JP2010/063619, filed on Aug. 11, 2010.

(51) Int. Cl.
*G06F 3/06* (2006.01)
*G06F 9/46* (2006.01)
(Continued)

(52) U.S. Cl.
CPC ............ *G06F 3/065* (2013.01); *G06F 3/0617* (2013.01); *G06F 3/0673* (2013.01);
(Continued)

(58) Field of Classification Search
CPC ... G06F 2009/4557; G06F 2009/45562; G06F 21/53; G06F 9/45545; G06F 3/065
See application file for complete search history.

(56) References Cited

U.S. PATENT DOCUMENTS 7,093,086 B1 * 8/2006 van Rietschote ... G06F 11/1438
711/161
7,644,302 B2   1/2010 Kambara et al.
(Continued)

FOREIGN PATENT DOCUMENTS

JP    2004-133894 A    4/2004
JP    2006-072591 A    3/2006
(Continued)

OTHER PUBLICATIONS

Toru Miyahara, "SD-ryu Kasoka Gijutsu Full Course [Migration-hen]", Software Design, Dec. 18, 2008 (Dec. 18, 2008), No. 218, pp. 40-42.

(Continued)

*Primary Examiner* — Reginald Bragdon
*Assistant Examiner* — Thanh Vo
(74) *Attorney, Agent, or Firm* — Fujitsu Patent Center

(57) ABSTRACT

A backup method may include discontinuing a process of a working system virtual machine (VM) operating within a physical machine (PM) of a processing apparatus, first duplicating data of a state of the working system VM in a memory of the PM, as a duplicating system VM, second duplicating data of contents of a working system virtual recording medium used to realize the working system VM, in a duplicating system virtual recording medium forming the duplicating system VM, within a storage apparatus of the processing apparatus, and resuming the process of the working system VM. The discontinuing and the first resuming may maintain consistency between the data in the memory and the storage apparatus.

21 Claims, 12 Drawing Sheets

(51) Int. Cl.
*G06F 9/48* (2006.01)
*G06F 11/14* (2006.01)
*G06F 9/455* (2006.01)

(52) U.S. Cl.
CPC .......... *G06F 9/45558* (2013.01); *G06F 9/461* (2013.01); *G06F 9/485* (2013.01); *G06F 11/1438* (2013.01); *G06F 2009/4557* (2013.01); *G06F 2009/45575* (2013.01); *G06F 2201/815* (2013.01); *G06F 2201/84* (2013.01)

(56) References Cited

U.S. PATENT DOCUMENTS

| | | |
|---|---|---|
| 8,321,377 B2 | 11/2012 | Michael et al. |
| 2004/0010787 A1 | 1/2004 | Traut et al. |
| 2006/0203815 A1* | 9/2006 | Couillard ............ H04L 12/4641 370/389 |
| 2007/0250833 A1* | 10/2007 | Araujo et al. .................... 718/1 |

FOREIGN PATENT DOCUMENTS

| | | |
|---|---|---|
| JP | 2007-183701 A | 7/2007 |
| JP | 2009-080692 A | 4/2009 |
| JP | 2009-533777 A | 9/2009 |

OTHER PUBLICATIONS

International Search Report, mailed in connection with PCT/JP2010/063619 and mailed Sep. 14, 2010.

* cited by examiner

FIG.3

| VM-ID | VM STATE | VIRTUAL DISK IDENTIFIER | PHYSICAL DISK ADDRESS | RESUME FLAG | ... |
|---|---|---|---|---|---|
| vm001 | EXECUTING | /dev/sd001 | iqn.2009-12.com.001 | "0" | |
| vm003 | EXECUTING | /dev/sd003 | iqn.2009-12.com.002 | "0" | |
| bk001 | STOPPED | /dev/sd001 | iqn.2009-12.com.bk001 | "1" | |
| ... | | | | | |

124

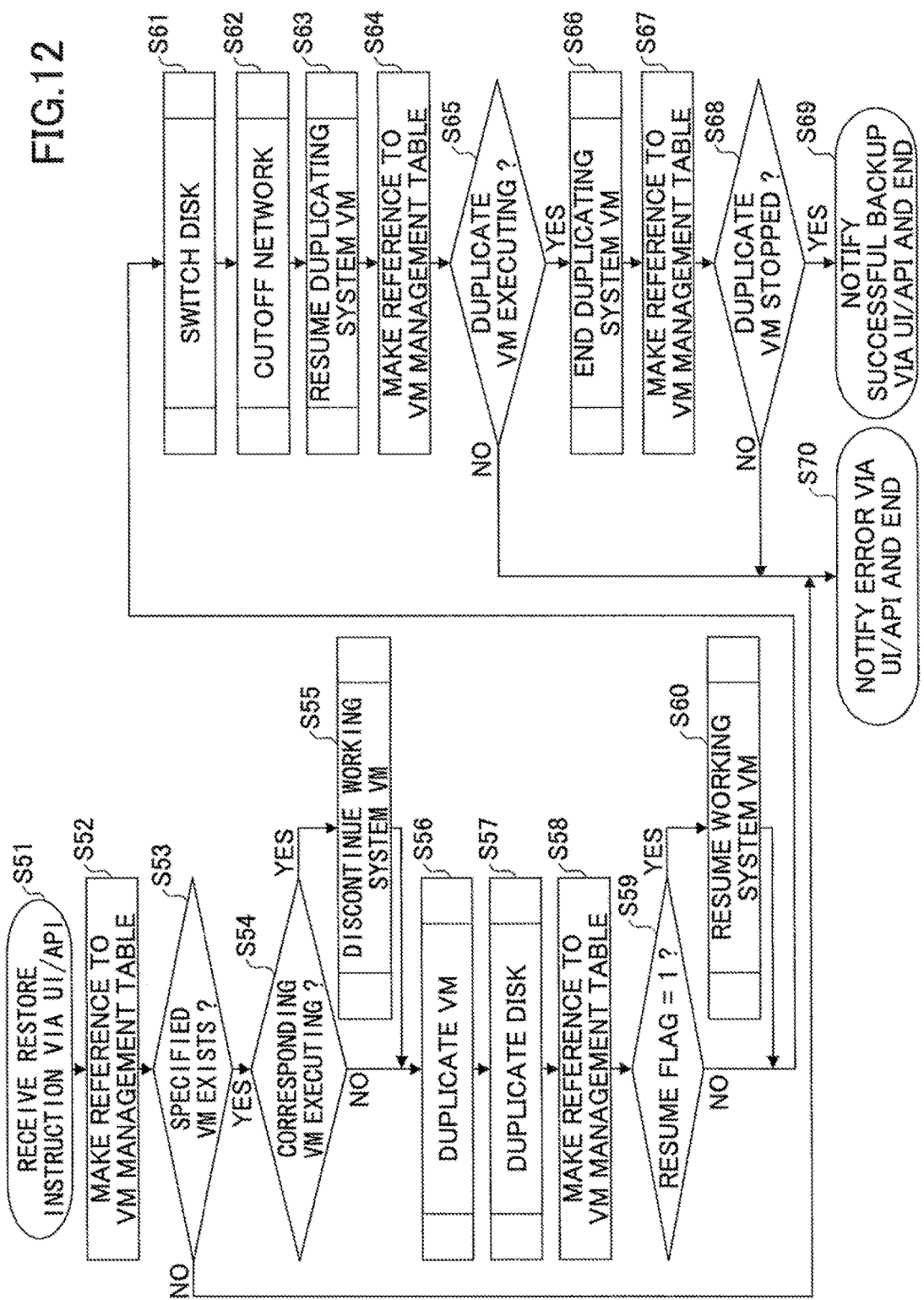

BACKUP METHOD AND INFORMATION PROCESSING APPARATUS

CROSS-REFERENCE TO RELATED APPLICATIONS

This application is a continuation application of International Application No. PCT/JP2010/063619 filed on Aug. 11, 2010 and designated the U.S., the entire contents of which are incorporated herein by reference.

FIELD

The embodiments discussed herein are related to a backup method, an information processing apparatus, and a computer-readable storage medians.

BACKGROUND

In a physical machine (hereinafter also referred to as a "computer"), an operating state of the computer may be acquired to provide a backup, in order to enable execution of a process to continue even when a fault is generated within the computer during the execution of the process. The backup of the operation state of the computer may be acquired as a so-called "snapshot". For example, even when the fault is generated within a working system computer, the snapshot of the operating state of the working system computer, acquired as the backup before the fault is generated, may be used to restore the operating state of the working system, computer before the fault is generated within a duplicating (or backup or copying) system computer.

On the other hand, in a VM (Virtual Machine), there are various proposed methods to acquire an operating state of the VM as the snapshot in order to cope with a situation in which the fault is generated within the VM. The operating state of the VM includes an operating state of a virtual processor (for example, a virtual CPU (Central Processing Unit)) and memory contents, where the virtual processor may run on (or operate in) a processor (for example, a CPU) of the computer in which the VM operates. In addition, the fault may include a fault that is caused by software and is generated within the VM, and a fault that is caused by hardware and is generated within the computer in which the VM operates.

According to the proposed method that provides the backup by acquiring the operating state of the VM as the snapshot, the operating state of the VM (operating state of the virtual CPU and memory contents) may be stored directly in a storage unit, such as a disk drive and the like, as backup data (that is, snapshot), in order to provide the backup. For this reason, it may take a relatively long time to perform a backup process, depending on a memory size allocated to the VM. Hence, a stop time of a working process may become relatively long when the working system VM is temporarily stopped during the backup process. On the other hand, when the working system VM is not temporarily stopped during the backup process, a data consistency cannot be maintained between the data of the VM restored using the backup data and the data of the working system VM. Furthermore, according to the proposed method, the VM may be restored using the backup data only when the fault is generated within the working system VM, and a reference to the backup data maintaining the data consistency cannot be made while the working system VM is operating. When the data consistency is not maintained, a state in which there is no dropout or discrepancy in a structure or meaning of the data when viewed front an application (or application program) that is executed in the working system VM (hereinafter referred to as an "application consistency") cannot be maintained.

In the case of a method that stops the working system VM during the backup process in order to maintain the application consistency, the working process or service may be discontinued. In this case, when the working system VM is used in a data center and the like, a notification may be required to notify users that the working process or service is discontinued. On the other hand, in the case of a method that embeds an associating mechanism with respect to the storage unit for each application and writes contents of a buffer and cache into the storage unit when creating the snapshot, the method cannot be applied to an application that does not have the associating mechanism. In addition, in the case of a method that calls a snapshot creating application in the storage unit side from the working system side applied with the working system VM, functions need to be added with respect, to the working system and users need to be educated. In this case, when the working VM is used in the data center and the like, the storage unit side may require multiplicity management, scheduling, and security measures.

The applicant is aware of Japanese Laid-Open Patent Publications No. 2009-533777, No. 2009-80692, and No. 2007-183701, for example.

According to the prior art backup method, it may be difficult to appropriately provide a backup of the data of the VM while the working system VM is operating.

SUMMARY

Accordingly, it is an object in one aspect of the embodiment to provide a backup method, an information processing apparatus, and a computer-readable storage medium, which may appropriately provide a backup of the data of the VM while the working system VM is operating.

According to one aspect of the present, invention, a backup method to backup data of an information processing apparatus including a storage apparatus and a physical machine that includes a memory, may include discontinuing a process of a working system virtual machine operating within the physical machine; first duplicating data of a state of the working system virtual machine in the memory, as a duplicating system virtual machine; second duplicating data of contents of a working system virtual recording medium used to realize the working system virtual machine, in a duplicating system virtual recording medium forming the duplicating system virtual machine, within the storage apparatus; and resuming the process of the working system virtual machine, wherein the discontinuing and the resuming maintain consistency between the data in the memory and the data in the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining an example of a VM management table;

FIG. 12 is a flow chart for explaining an example of an operation of the backup mechanism.

DESCRIPTION OF EMBODIMENTS

Preferred embodiments of the present invention will be described with reference to the accompanying drawings.

In one embodiment, a backup method, an information processing apparatus, and a computer-readable storage medium may backup data of the information processing apparatus including a storage apparatus and a physical machine that includes a memory. The backup process may include discontinuing a process of a working system virtual machine operating within the physical machine, duplicating data of a state of the working system virtual machine in the memory, as a duplicating system virtual machine, duplicating data of contents of a working system virtual recording medium used to realize the working system virtual machine, in a duplicating system virtual recording medium forming the duplicating system, virtual machine, within the storage apparatus, and resuming the process of the working system virtual machine. The discontinuing and the resuming may maintain consistency between the data in the memory and the data in the storage apparatus.

Because the backup process may duplicate the state of the working system virtual machine in the memory, as the duplicating system virtual machine, substantially without stopping the working system virtual machine, the backup of the state of the working system virtual machine to the duplicate system virtual machine may be performed appropriately while the working virtual machine operates.

A description will now be given of the backup method, the information processing apparatus, and the computer-readable storage medium in each embodiment according to the present invention.

[First Embodiment]

Figure 1:
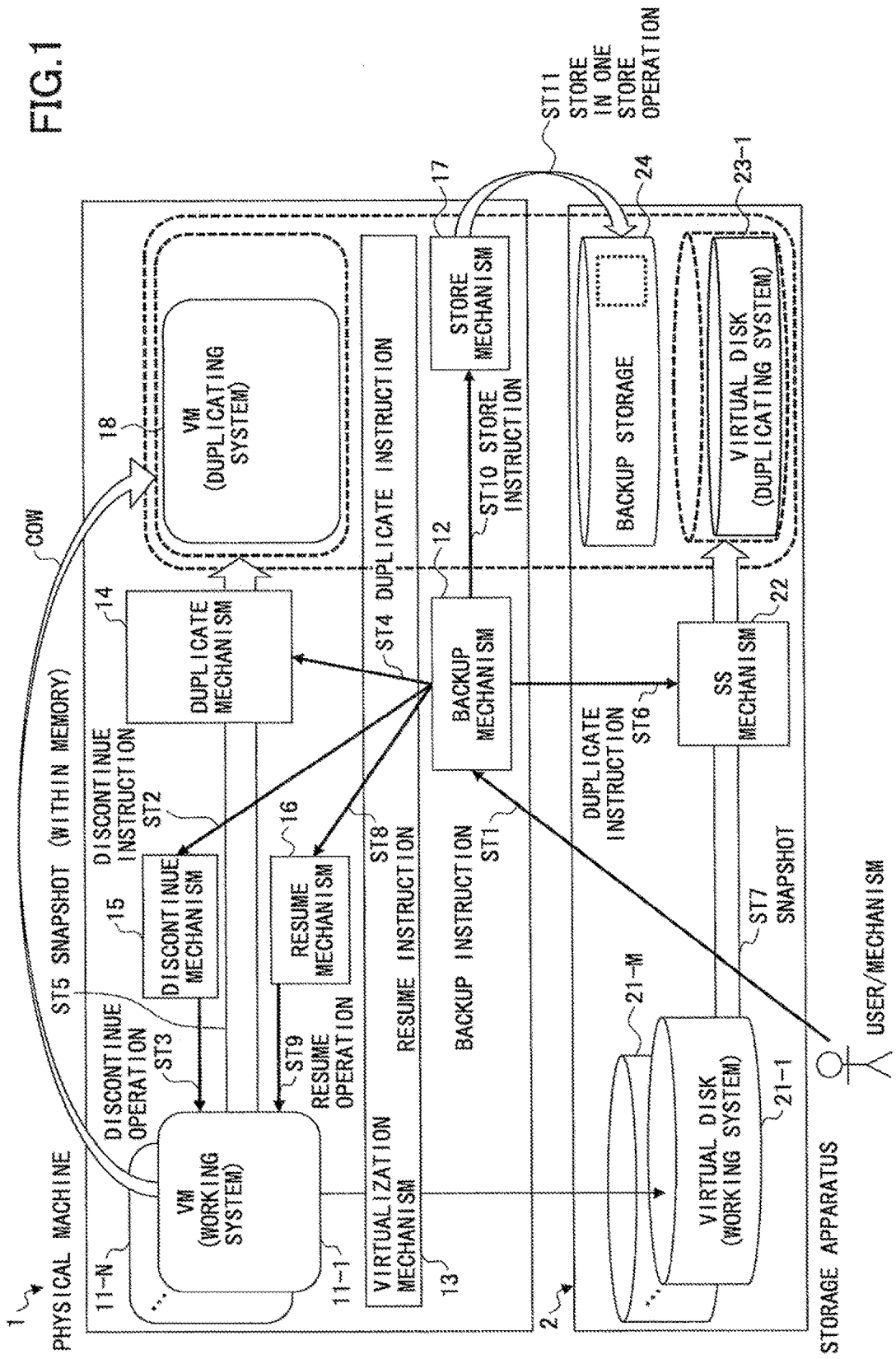
FIG. 1 is a block diagram illustrating an information processing apparatus in a first embodiment of the present invention.

FIG. 1 is a block diagram illustrating an information processing apparatus in a first embodiment of the present invention. The information processing apparatus (computer or computer system) illustrated in FIG. 1 may be formed by at least a physical machine (hereinafter also referred to as a "computer") 1, and in this embodiment, the information processing apparatus includes a storage apparatus 2. However, the storage apparatus 2 may be externally connected to the computer 1 via a network and the like.

The computer 1 may have a known hardware structure including at least one processor, such as a CPU and the like, at least one memory, an input device such as a keyboard and the like, a display unit, and the like. The memory may store one or more programs to be executed by the processor, and various data including intermediate data of computation processes executed by the processor. Working system VMs (Virtual Machines; 11-1 through 11-N (N is a natural number greater than or equal to one), a duplicating (or backup or copying) system VM 18, a backup mechanism 12, a visualization mechanism 13, a duplicate mechanism 14, a discontinue mechanism 15, a resume mechanism 16, and a store mechanism 17 of the computer 1 may respectively correspond to functions or means that are realized when the processor executes procedures of the program. The visualization mechanism 13 may provide a known function or means that realizes the VMs 11-1 through 11-N and 18 within the computer 1. In FIG. 1, parts of the duplicating system are surrounded by a dotted line.

On the other hand, the storage apparatus 2 may have a known structure including at least one processor and at least one storage unit. In this embodiment, it is assumed for the sake of convenience that the storage unit forming the storage apparatus 2 is at least one disk drive having at least one disk recording medium (that is, physical recording medium). The storage apparatus 2 may include working system virtual disks 21-1 through 21-M (M is a natural number greater than or equal to two, a SS (Snap-Shot) mechanism 22, a duplicating system virtual disk 23-1, and a backup storage 24.

The SS mechanism 22 may be provided within the computer 1, instead of within the storage apparatus 2. In addition, the backup storage 24 may be formed by a storage unit that is separate from the storage apparatus 2 and is externally connected to the computer 1, as long as the backup storage 24 is accessible from the store mechanism 17.

When a user inputs a backup instruction from the input device to the backup mechanism 12, or a known timer mechanism (not illustrated) within the computer 1 inputs the backup instruction to the backup mechanism 12 in step ST1, the backup mechanism 12 issues a discontinue instruction with respect to the discontinue mechanism 12 in step ST2. The timer mechanism may input the backup instruction to the backup mechanism 12 for every predetermined time, or at a timing in accordance with an arbitrary schedule that may be preset. In addition, a sequence in which the timer mechanism inputs the backup instruction of the plurality of working system VMs 11-1 through 11-N to the backup mechanism 12 may be fixedly set to an arbitrary sequence, or may be set to a random sequence. For example, when the backup instruction of the working system VM 11-1 is input, the discontinue mechanism 15 may execute a discontinue operation with respect to the working system VM 11-1 in order to discontinue the process of the working system VM 11-1 in step ST3. On the other hand, the backup mechanism 15 may issue a duplicate instruction with respect to the duplicate mechanism 14 in step ST4. Hence, the duplicate mechanism 14 may create, within the memory, a duplicate of the operating state of the virtual CPU forming the working system VM 11-1 and the contents of the memory (or memory contents) used to realize the working system VM 11-1, that, is a snapshot of the operating state, in step ST5. Because the operating state of the virtual CPU forming the working system VM 11-1 is stored within the memory that stores the memory contents used to realize the working system VM 11-1, the snapshot of the operating state created within the memory, used to realize the duplicating system VM 18 by the duplicate mechanism 14, corresponds to the duplicate of the memory contents used to realize the working system VM 11-1. In this embodiment, the snapshot of the operating state of the working system VM 11-1 may be created within the memory, as the duplicating system VM 18, by a COW (Copy On Write), as indicated by COW in FIG. 1.

Accordingly, when storing the operating state of the working system VM 11-1 (that is, memory contents used to realize the working system VM 11-1), the working system VM 11-1 may be duplicated temporarily or permanently in the memory within the computer 11, instead of writing the operating state directly to the disk of the storage apparatus 2. For this reason, the backup process may be performed at a high speed.

The backup mechanism 12 may issue a duplicate instruction with respect to the SS mechanism. 22 in step ST6. Hence, the SS mechanism 22 may create a snapshot of the working system virtual disk 21-1 of the storage apparatus 2, for example, in the duplicating system, virtual disk 23-1 in step ST7. On the other hand, the backup mechanism 12 may issue a resume instruction with respect to the resume mechanism 16 in step ST8. The resume mechanism 16 may execute a resume operation to resume the process with respect to the working system VM whose process is discontinued by the discontinue mechanism 15 and whose snapshot of the operating state is formed in the duplicating system VM 18 by the duplicate mechanism 14, that is, with respect to the working system VM 11-1 in this example, in step ST9.

In addition, the backup mechanism 12 may issue a store instruction with respect to the store mechanism 17 in step ST10. Hence, the store mechanism 17 may store the memory contents of the duplicating system VM 18 and the contents of the duplicating system virtual disk 23-1 into the backup storage 24 in a single store operation in step ST11. A timing at which the backup mechanism 12 issues the store instruction with respect to the store mechanism 17 may be any arbitrary timing after the process of the working system VM 11-1 is resumed by the resume mechanism 16, and may be a timing instructed by the timer mechanism, for example. In other words, the process that stores the memory contents of the duplicating system VM 18 and the contents of the duplicating system virtual disk 23-1 into the backup storage 24 in the single store operation may be completed without affecting the process of the working system VM 11-1. However, because the process of creating the duplicate of the operating state of the virtual CPU and the memory contents of the working system VM 11-1 within the memory of the duplicating system VM 18, and the process of creating the duplicate of the contents of the working system virtual disk 21-1 within the duplicating system virtual disk 23-1 may foe executed asynchronously to each other, the discontinue mechanism 15 and the resume mechanism 16 operate to maintain the consistency of the data in the memory and the data in the disk. In addition, by executing the process of creating the duplicate of the operating state of the virtual CPU and the memory contents of the working system VM 11-1 within the memory of the duplicating system VM 18 (that is, creating the snapshot of the operating state) by the COW, the time for which the process of the working system VM 11-1 stops may be further reduced, and a memory capacity of the duplicating system VM 18 used to store the snapshot of the operating state may be reduced. For this reason, even when the memory size of the working system VM 11-1 is relatively large, the duplicate of the contents of the working system virtual disk 21-1 may be created in a satisfactory manner.

Figure 2:
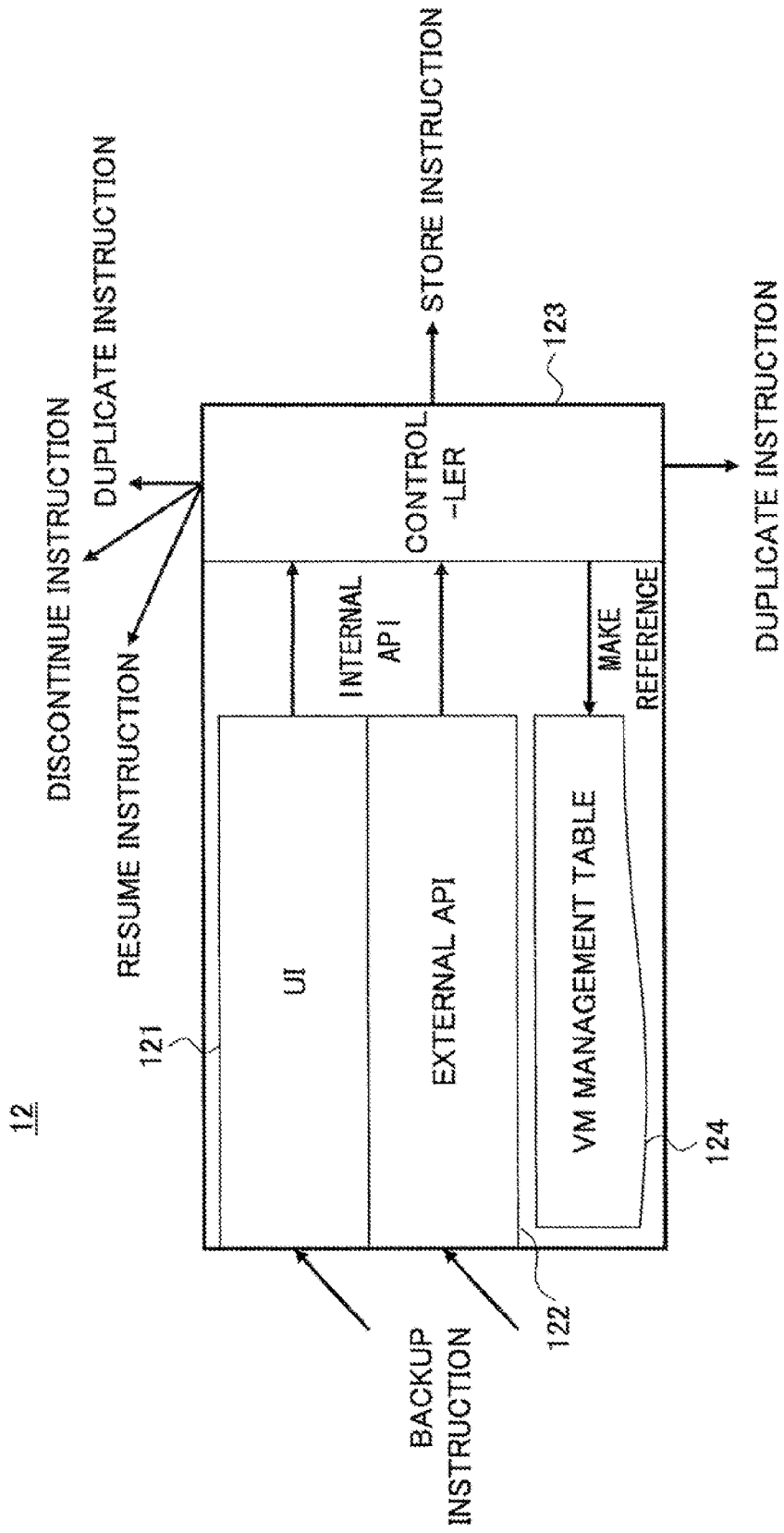
FIG. 2 is a diagram for explaining an example of a backup mechanism.

FIG. 2 is a diagram for explaining an example of the backup mechanism 12. The backup mechanism 12 may include a UI (User Interface) 121, an external API (Application Programming Interface) 122, a controller 123, and a VM management table 124. The UI 121 may include a Web UI, a GUI (Graphic User Interface), a command line, and the like. The UI 121 may receive the backup instruction that is input by the user from the input device. On the other hand, the external API 122 may receive the backup instruction from the timer mechanism and the like within the computer 1. The UI 121 and the external API 122 may respond to the backup instruction and call an internal API provided by the controller 123. The controller 123 may make a reference to the VM management table 124 when necessary, based on the call from the internal API, in order to output the discontinue instruction, the duplicate instruction, the resume instruction, and the store instruction.

FIG. 3 is a diagram for explaining an example of the VM management table 124. In this example, the VM management table 124 may include a VM identifier VM-ID to identify each of the VMs 1-1 through 11-8 (including the VM 18), a VM state indicating the operating state of the virtual CPU of the VM, a virtual disk identifier to identify each of the virtual disks 21-1 through 21-M )including the virtual disk 23-1), a physical disk address indicating an address of each disk within the storage apparatus 2, a resume flag indicating whether the stopped VM is to resume the process, and the like. In this example, "vm" added in front of the VM-ID managed by the VM management table 124 indicates the working system VM, and "bk" added in front of the VM-ID indicates the duplicate system VM.

Information held by the known virtualization mechanism 13 may include at least a part of the information managed by the VM management table 124. Hence, the VM management table 124 may be created by making a reference to the information held by the virtualization mechanism 13.

Figure 4:
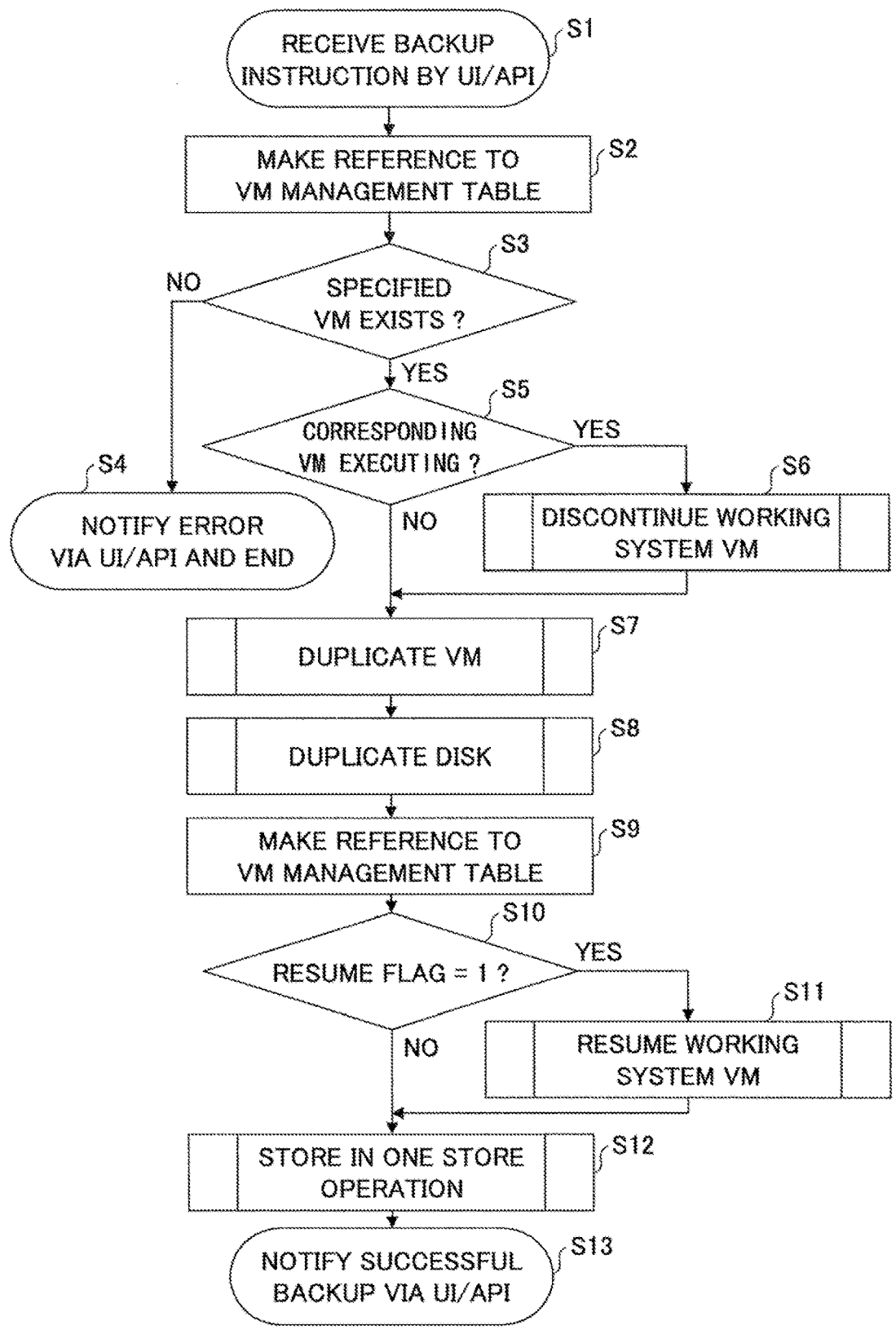
FIG. 4 is a flow chart for explaining an example of an operation of the backup mechanism.

FIG. 4 is a flow chart for explaining an example of an operation of the backup mechanism 12. In step S1, the UI 121 or the external API 122 receives a backup instruction. In step S2, the controller 123 makes a reference to the VM management table 124 based on the call, issued by the UI 121 or the external API 122 in response to the backup instruction, calling the internal API. In step S3, the controller 123 judges whether the VM having the VM-ID specified by the backup instruction exists, that is, the VM having the specified VM-ID is managed by the VM management table 124. When the judgment result in step S3 is NO, the process advances to step S4. In step S4, the controller 123 notifies an error with respect to the UI 121 or the external API 122 that received the back instruction, and the process ends.

On the other hand, the process advances to step SS when the judgment result in step S3 is YES. In step S5, the controller 123 judges whether the VM having the VM-ID specified by the backup instruction and managed by the VM management table 124 has a VM state that indicates "executing", and the process advances to step S6 when the judgment result in step SS is YES. In step S6, the controller 123 outputs a discontinue instruction with respect to the discontinue mechanism 15, instructing the process of the VM that is "executing", that is, the working system VM, to be discontinued. Hence, the discontinue mechanism 15 may update the VM state of the VM having the corresponding VM-ID in the management table 12 to "stopped" in response to the discontinue instruction, and sets the resume flag to "1" in order to indicate that the process of this VM needs to be resumed. When the judgment result in step S5 is NO, or after step S6, the process advances to step S7. In step S7, the controller 123 outputs a duplicate instruction with respect to the duplicate mechanism 14, instructing the duplicate of the working system VM to be created. Hence, the duplicate mechanism 14 may create a duplicate of the operating state of the virtual CPU forming the VM of the working system VM and the memory contents used to realize the working system VM, that is, the snapshot of the operating state, within the memory that stores the memory contents used to realize the duplicating system VM, in response to the duplicate instruction. Step S8 outputs the duplicate instruction with respect to the SS mechanism 22, instructing the duplicate of the working system virtual disk 21-1 to be created. Accordingly, the SS mechanism 22 may create the duplicate of the contents of the working system virtual disk 21-1, that is, the snapshot of the storage apparatus 2, within the duplicating system virtual disk 23-1, in response to the duplicate instruction. In step S9, the controller 123 makes a reference to the information of the VM that is managed by the VM management table 124 and has the VM-ID specified by the backup instruction.

In step S10, the controller 123 judges whether the resume flag of the VM-ID, managed by the VM management table 124 and specified by the backup instruction, is set to "1", and the process advances to step S11 when the judgment result in step S10 is YES. In step S11, the controller 123 outputs a resume instruction with respect to the resume mechanism 16. Hence, the resume mechanism 16 may clear the resume flag of the VM having the corresponding VM-ID in the VM management table 124 to "0", in response to the resume instruction. When the judgment result in step S10 is 110, or after step S11, the process advances to step S12. In step S12, the controller 123 outputs a store instruction with respect to the store mechanism 17. Accordingly, the store mechanism 17 may store the memory contents of the duplicating system VM 18 and the contents of the duplicating system virtual disk 23-1 in the backup storage 24 in the single store operation. In step S13, the controller 123 notifies the backup completion or the successful backup via the UI 121 or the external API 122 that received the backup instruction, and the process ends.

According to the backup process of this embodiment, the backup of the data of the working system VM may be provided while the working VM is operating, and in a state in which the application consistency is maintained.

In addition, because the operating state of the working system VM may be duplicated in the memory at a high speed, the backup process may be completed within a predictable time substantially without stopping the working system VM. Hence, when the VM is used in the data center, for example, an operator or manager of the data center may flexibly schedule the system backup operation.

Moreover, by duplicating the operating state of the working system VM within the memory in the VM format, the process may be resumed by the duplicating system VM when a fault is generated in the working system VM, in order to quickly restore the system using the VM. Of course, the operating state of the working system VM stored in the memory, that is, the duplicating system VM, may be discarded at an arbitrary timing, such as when the storage to the backup storage in the single store operation is completed, for example.

Furthermore, because there is no need to embed the backup mechanism for maintaining the application consistency in the VM, the cost of negotiations or exchanges between the operator or manager and the user, embedding operation, and inspection operation may foe prevented from increasing. In addition, because there is no need to embed the backup mechanism for maintaining the application consistency in the VM, the application consistency may be maintained regardless of the operating state or the type of an OS (Operating System) and applications running on the VM.

[Second Embodiment]

Figure 5:
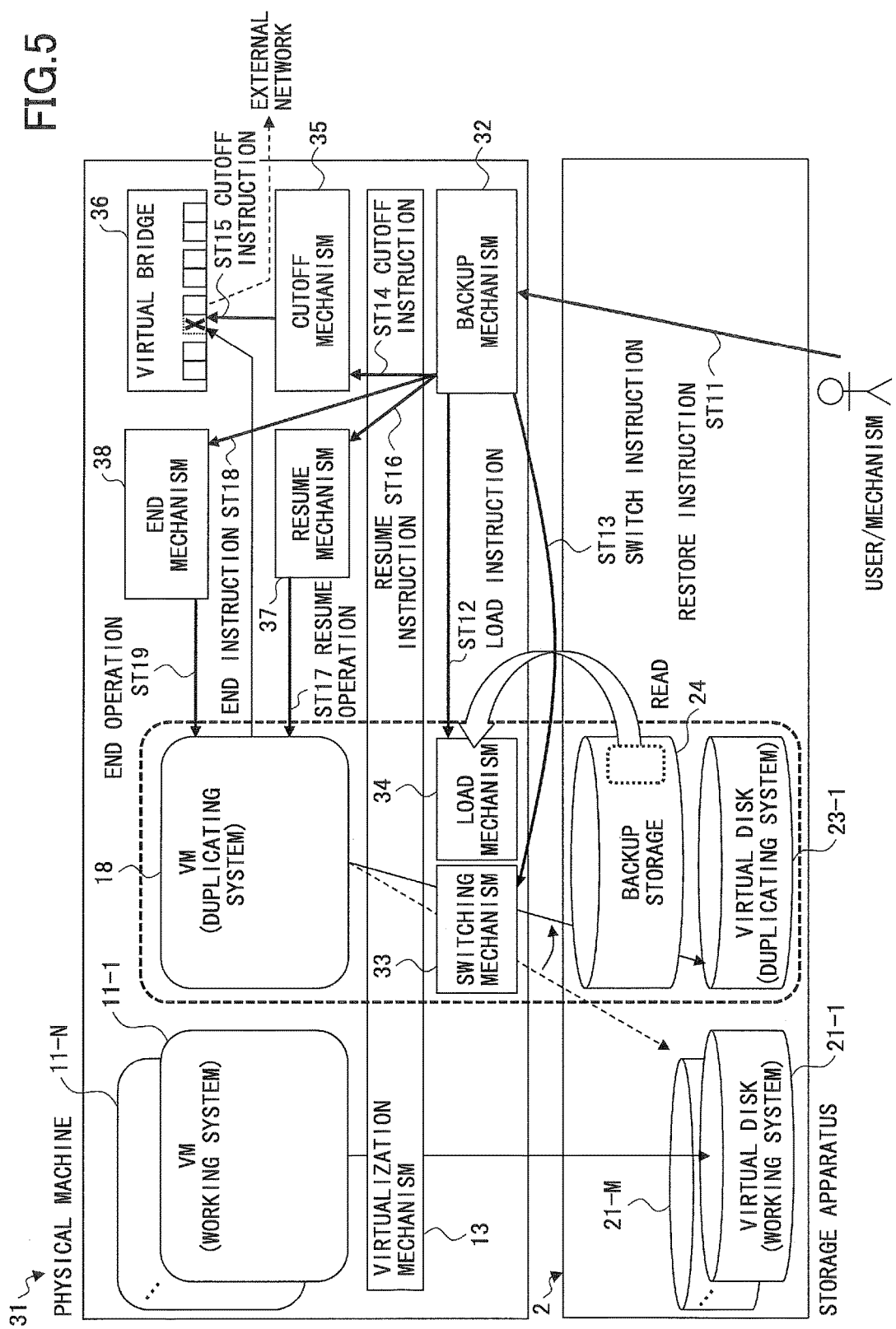
FIG. 5 is a block diagram illustrating the information processing apparatus in a second embodiment of the present invention.

FIG. 5 is a block diagram illustrating the information processing apparatus in a second embodiment of the present invention. In FIG. 5, those parts that are the same as those corresponding parts in FIG. 1 are designated by the same reference numerals, and a description thereof will be omitted. Further, illustration of the duplicating mechanism 14, the discontinue mechanism 15, the resume mechanism 16, the store mechanism 17, and the SS mechanism 22 will be omitted in FIG. 5. A computer 31 illustrated in FIG. 5 may include a backup mechanism 32, a switching mechanism 33, a load mechanism 34, a cutoff mechanism 35, a virtual bridge 36, a resume mechanism 37, and an end mechanism 38. In FIG. 5, parts of the duplicating system are surrounded by a dotted line.

In this embodiment, a virtual disk at a connecting destination of the duplicating system VM 18 is switched to the duplicating system virtual disk 23-1 different from the working system virtual disk 21-1. In order not to affect the process (or operation) of the working system VM 11-1, an external network connection of the duplicating system VM 18 is cutoff so that the duplicating system VM 18 cannot make a network communication with a VM other than itself. After the external network connection of the duplicating system VM 18 is cutoff, the process (or operation) of the duplicating system VM 18 is resumed. These series of processes may be executed automatically by the backup mechanism 32 in succession to the storage of the contents to the backup storage 24 in a single store operation in accordance with the first embodiment described above.

When the user inputs a restore instruction from the input device to the backup mechanism 32, or a restore instruction generated within the computer 31 is input to the backup mechanism 12 in step ST11, the backup mechanism 32 issues a load instruction with respect to the load mechanism. 34 in step ST12, issues a switch instruction with respect to the switching mechanism 33 in step ST13, and issues a cutoff instruction with respect to the cutoff mechanism 35 in step ST14. The cutoff mechanism 35 issues the cutoff instruction with respect to the virtual bridge 36 in step ST15. The backup mechanism 32 issues a resume instruction with respect to the resume mechanism 37 in step ST16, and the resume mechanism 37 executes a resume operation to resume the process with respect to the duplicating system VM 18 in step ST17. In addition, the backup mechanism 32 issues an end instruction with respect to the end mechanism 38 in step ST18, and the end mechanism 38 executes an end operation that ends the process of the duplicating system VM (hereinafter also referred to as the "duplicate VM") 18 by a shutdown procedure in step ST19.

Figure 6:
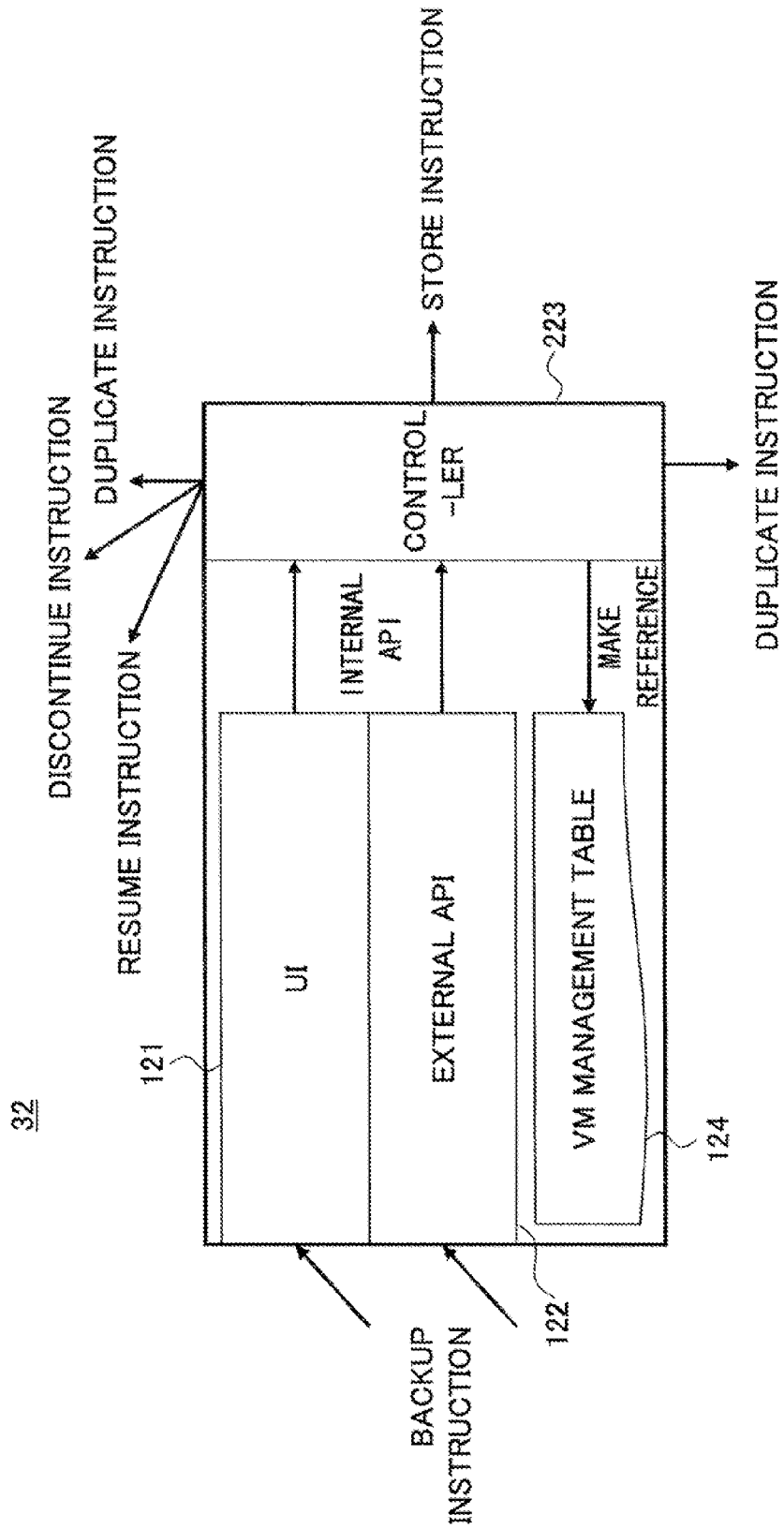
FIG. 6 is a diagram for explaining an example of the backup mechanism.

FIG. 6 is a diagram for explaining an example of the backup mechanism 32. In FIG. 6, those parts that are the same as those corresponding parts in FIG. 2 are designated by the same reference numerals, and a description thereof will be omitted. A controller 223 of the backup mechanism 32 differs from the controller 23 of the backup mechanism 12 illustrated in FIG. 2, in that the controller 223 outputs the load instruction with respect to the load mechanism 34, the switch instruction with respect to the switching mechanism 33, the cutoff instruction with respect to the cutoff mechanism 35, the resume instruction with respect to the res unite mechanism 37, and the end instruction with respect to the end mechanism 38, in addition, to the discontinue instruction, the duplicate instruction, the resume instruction, and the store instruction output by the backup mechanism 12.

Figure 7:
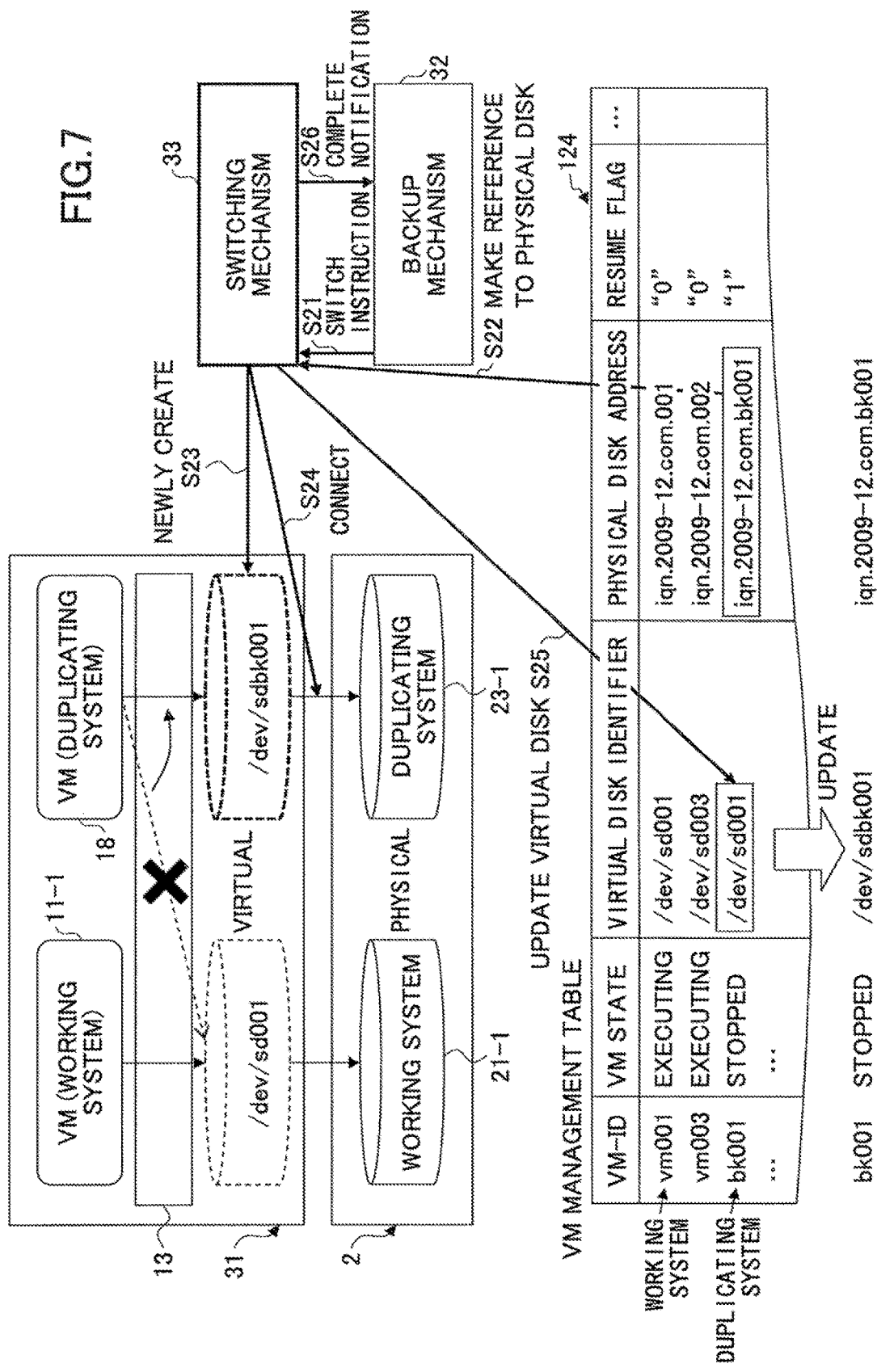
FIG. 7 is a diagram for explaining an example of a switching mechanism.

FIG. 7 is a diagram for explaining an example of the switching mechanism 33. In FIG. 7, those parts that are the same as those corresponding parts in FIGS. 3 and 5 are designated by the same reference numerals, and a description thereof will be omitted. In addition, FIG. 8 is a flow chart for explaining an example of an operation of the switching mechanism 33.

Physical disk regions for each of the VMs 11-1 through 11-N and 18 within the storage apparatus 2 correspond to each of the virtual disks 21-1 through 21-M and 23-1 in the computer 31. The visualization, mechanism 13 performs the process of making each of the virtual disks 21-1 through 21-M and 23-1 correspond to each of the VMs 11-1 through 11-N and 18. The process of making the virtual disk correspond to the VM may also be executed in the first embodiment described above. The switching mechanism 33 switches the correspondence of the virtual disks and the VMs, in order to avoid the duplicate system VM from writing to and reading from the virtual disk identical to the virtual disk to which and from which the working system VM performs the writing and reading.

Figure 8:
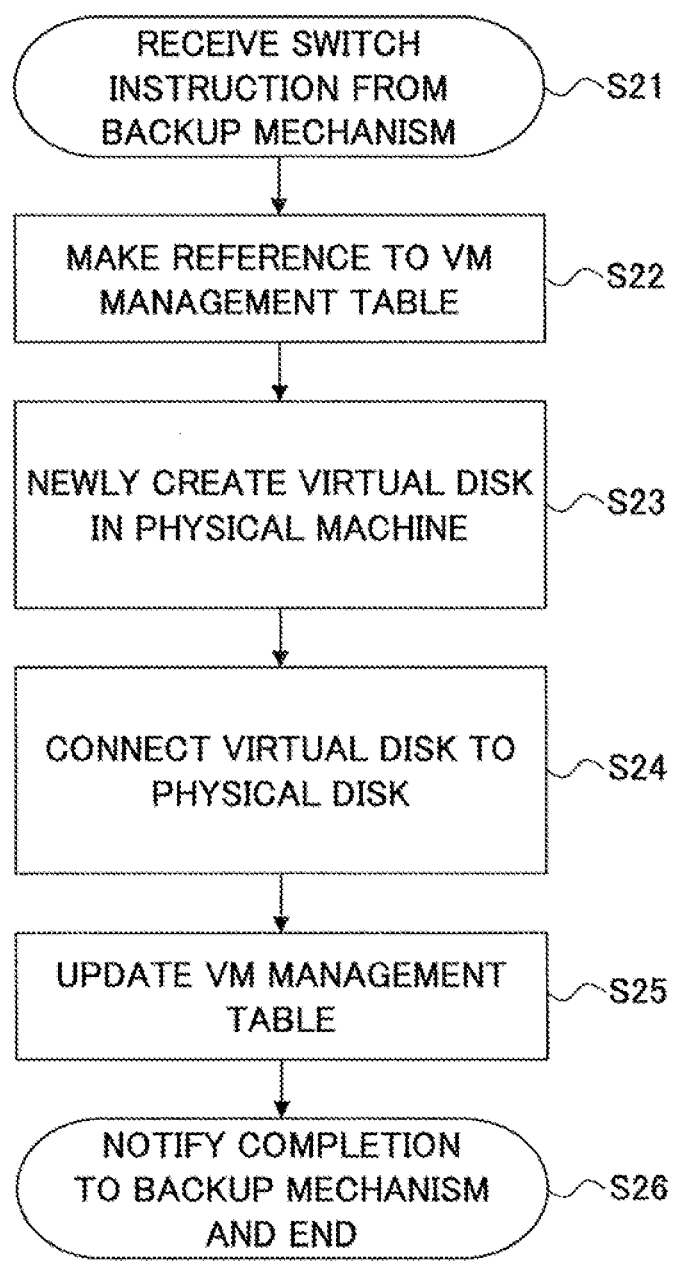
FIG. 8 is a flow chart for explaining an example of an operation of the switching mechanism.

In step S21 illustrated in FIGS. 7 and 8, the switching mechanism 33 receives the switch instruction with respect to the duplicating system VM 18 from the backup mechanism 32. In step S22, the switching mechanism 33 makes a reference to the VM management table 124, and acquires the physical disk address of the physical disk that is a switching target. In step S23, the switching mechanism 33 newly creates a duplicating system virtual disk that is different from the working system virtual disk in the computer 31. In this example, the physical disk address acquired in step S22 is "iqn.2009-12.com.bk001", and the virtual disk identifier of the duplicating system virtual disk newly created in step S23 is "dev/sdbk001" which is different from the virtual disk identifier "/dev/sd001" of the working system virtual disk. In step S24, the switching mechanism 33 connects, tat is, relates, the newly created duplicating system virtual disk to the physical disk within the storage apparatus 2. In step S25, the switching mechanism 33 updates the virtual disk identifier column in the VM management table 124. In this example, the virtual disk identifier with respect to the VM-ID "bk001" managed by the VM management table 124 is "/dev/sd001", and is the same as the virtual disk identifier with respect to the VM-ID "vm001", but is updated to "/dev/sdbk001" in step S25. In step S26, the switching mechanism 33 performs a complete notification with respect to the backup mechanism 32 to indicate that the switching of the virtual disks is completed.

Figure 9:
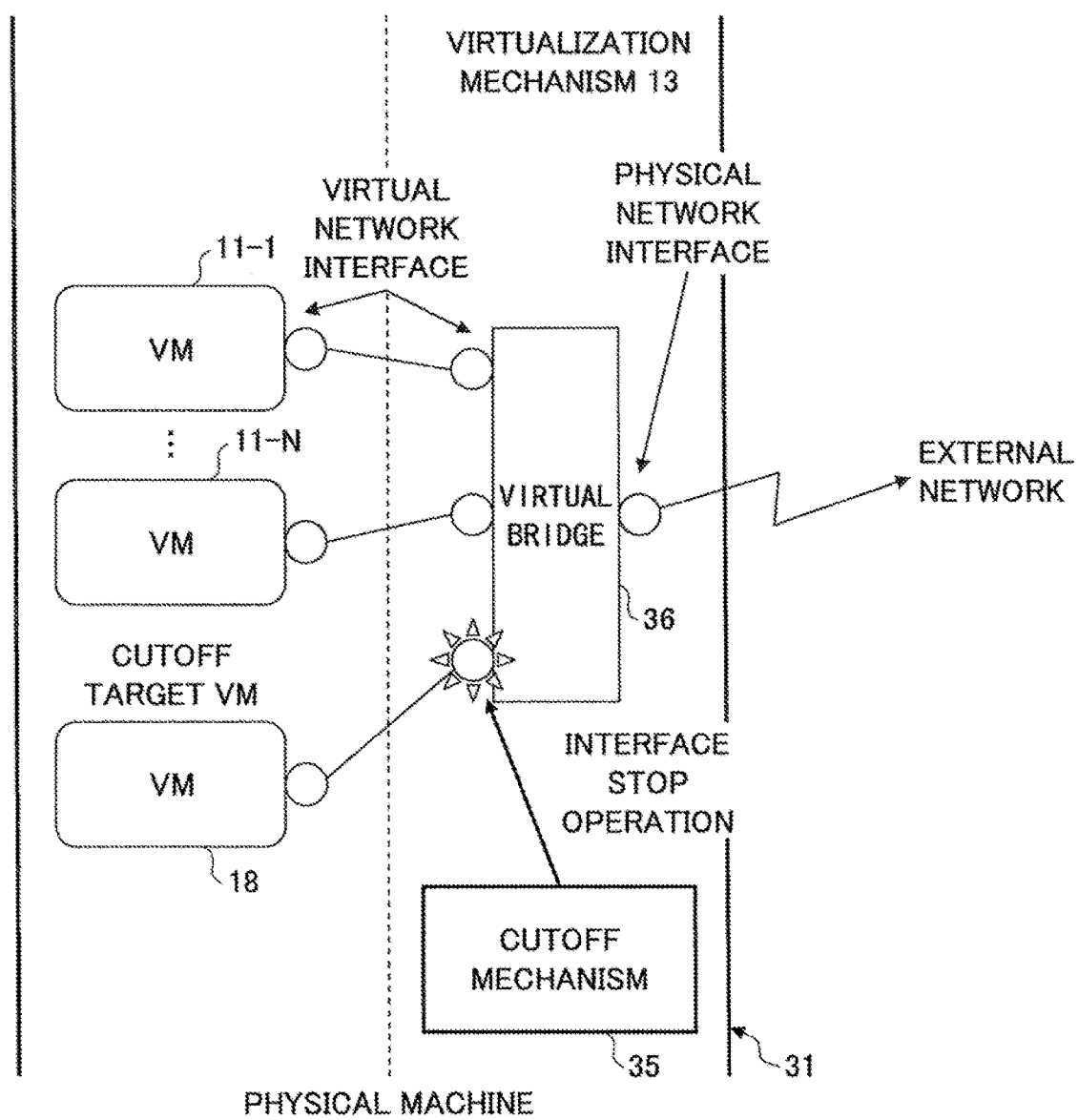
FIG. 9 is a diagram for explaining an example of a cutoff mechanism.

FIG. 9 is a diagram for explaining an example of the cutoff mechanism 35. As illustrated in FIG. 9, each of the VMs 11-1 through 11-N and 18 within the computer 31 is connectable to an external network via the virtual bridge 36. Each VM and the virtual bridge 36 may be connected by a known virtual network interface, and the virtual bridge 36 and the external network may be connected by a known physical network interface. The cutoff mechanism 35 may execute a stop operation to stop the virtual network interface between the duplicating system VM 18 that is a cutoff target, for example, and the virtual bridge 36, in response to the cutoff instruction from the backup mechanism 32. Hence, the stop operation makes it appear as if the connected party no longer response to the duplicating system VM 18 that is the cutoff target. The duplicating system VM 18 that is the cutoff target may be cutoff with respect to the external-network in the manner described above.

Figure 10:
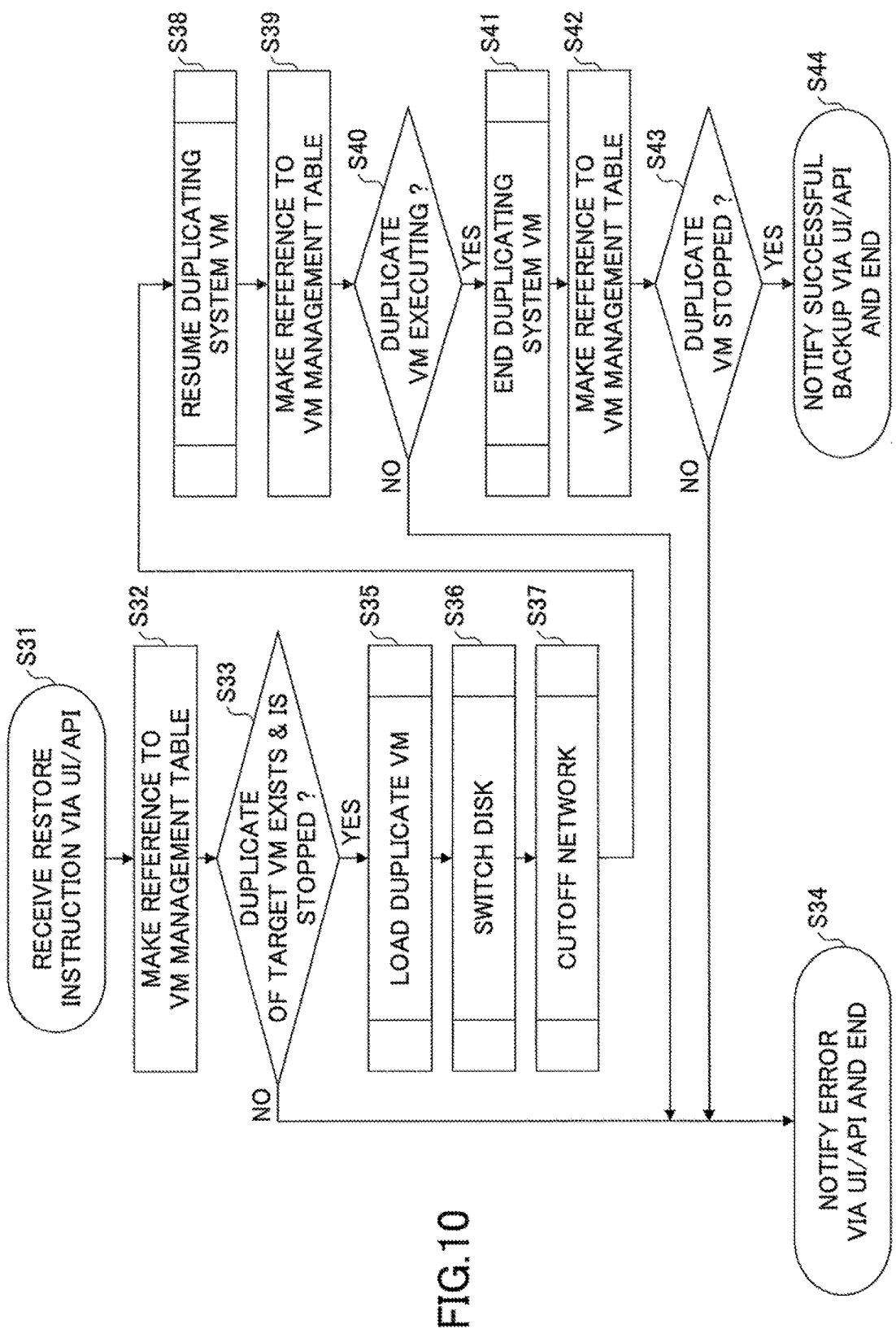
FIG. 10 is a flow chart for explaining an example of an operation of the backup mechanism.

FIG. 10 is a flow chart for explaining an example of an operation of the backup mechanism 32. In step S31, the backup mechanism 32 receives the restore instruction via the UI 121 or the external API 122. In step S32, the controller 223 makes a reference to the VM management table 124 based on the call for the internal API, executed by the UI 121 or the external API 122 in response to a restore instruction. In step S33, the controller 223 judges whether the VM-ID of the duplicating system VM 18 with respect to the target VM specified by the restore instruction, such as the working system VM 11-1, for example, exists in and is managed by the VM management table 124, and whether the VM state of this duplicating system VM 18 is "stopped". When the judgment result in step S33 is NO, the process advances to step S34. In step S34, the controller 223 makes an error notification via the UI 121 or the external API 122 that received by the restore instruction, and the process ends.

On the other hand, when the judgment result in step S33 is YES, the process advances to step S35. In step S35, the controller 223 outputs a load instruction with respect to the load mechanism 34. Hence, the load mechanism 34 loads the duplicating system VM 18 that is specified by the restore instruction and is managed by the VM management table 124 and whose executing state is "stopped", from the backup storage 24 to the computer 1, in response to the load instruction. In step S36, the controller 223 outputs a switch instruction with respect to the switching mechanism 33. Accordingly, the switching mechanism 33 executes the switching of the virtual disks as described above in conjunction with FIG. 7 in response to the switch instruction, and updates the virtual disk identifier of the VM management table 124 depending on the switching of the virtual disks. In step S37, the controller 223 outputs a cutoff instruction with respect to the cutoff mechanism 35. Thus, the cutoff mechanism 35 cuts off the duplicating system VM 18, that is the cutoff target specified by the restore instruction, with respect to the external network, in the manner described above in conjunction with FIG. 9, in response to the cutoff instruction.

In step S38, the controller 223 outputs a resume instruction with respect to the resume mechanism 37. Hence, the resume mechanism 37 executes a resume operation to resume the process of the duplicating system VM 18 that is specified by the restore instruction, in response to the resume instruction. In addition, the resume mechanism 37 updates the VM state with respect to the VM-ID of the duplicating system VM 18 that is managed in the VM management table 124 to "executing". In step S39, the controller 223 makes a reference to the VM management table 124. In step S40, the controller 223 judges whether the VM state with respect to the VM-ID of the duplicating system VM 18 specified by the restore instruction is "executing" in the VM management table 124 to which the reference is made by the controller 223. The process advances to step S34 when the judgment result in step S40 is NO.

On the other hand, the process advances to step S41 when the judgment result in step S40 is YES. In step S41, the controller 223 outputs an end instruction with respect to the end mechanism 38. Hence, the end mechanism 38 executes an end operation to end the process of the duplicating system VM 18 specified by the restore instruction by a shutdown procedure, in response to the end instruction. In addition, the end mechanism 38 updates the VM state with respect to the VM-ID of the duplicating system VM 18 managed by the VM management table 124 to "executing". In step S42, the controller 223 makes a reference to the VM management table 124. In step S43, the controller 223 judges whether the VM state with respect to the VM-ID of the duplicating system VM 18 specified by the restore instruction is "stopped" in the VM management table 124 to which the reference is made by the controller 223. The process advances to step S34 when the judgment result in step S43 is NO, and the process advances to step S44 when the judgment result in step S43 is YES. In step S44, the controller 223 notifies the restore completion or the successful, restore via the UI 121 or the external API 122 that received the restore instruction, and the process ends.

According to this embodiment, by executing the loading of the duplicate system VM, the resume of the process, and the end of the process, the backup is created from the duplicate system VM, and the application consistency may be maintained solely by the virtual disk forming the duplicate system VM. In addition, by switching the virtual, disk at the connecting destination of the duplicate system VM to the duplicate system virtual disk different from the working system virtual disk, and cutting off the connection of the duplicate system VM with respect to the external network, the application consistency may be maintained solely by the virtual disk of the forming the duplicate system VM without affecting the process of the working system VM. As a result, the duplicate system virtual disk maintaining the application consistency may be referred to or be updated from the working system VM or an external system.

[Third Embodiment]

Figure 11:
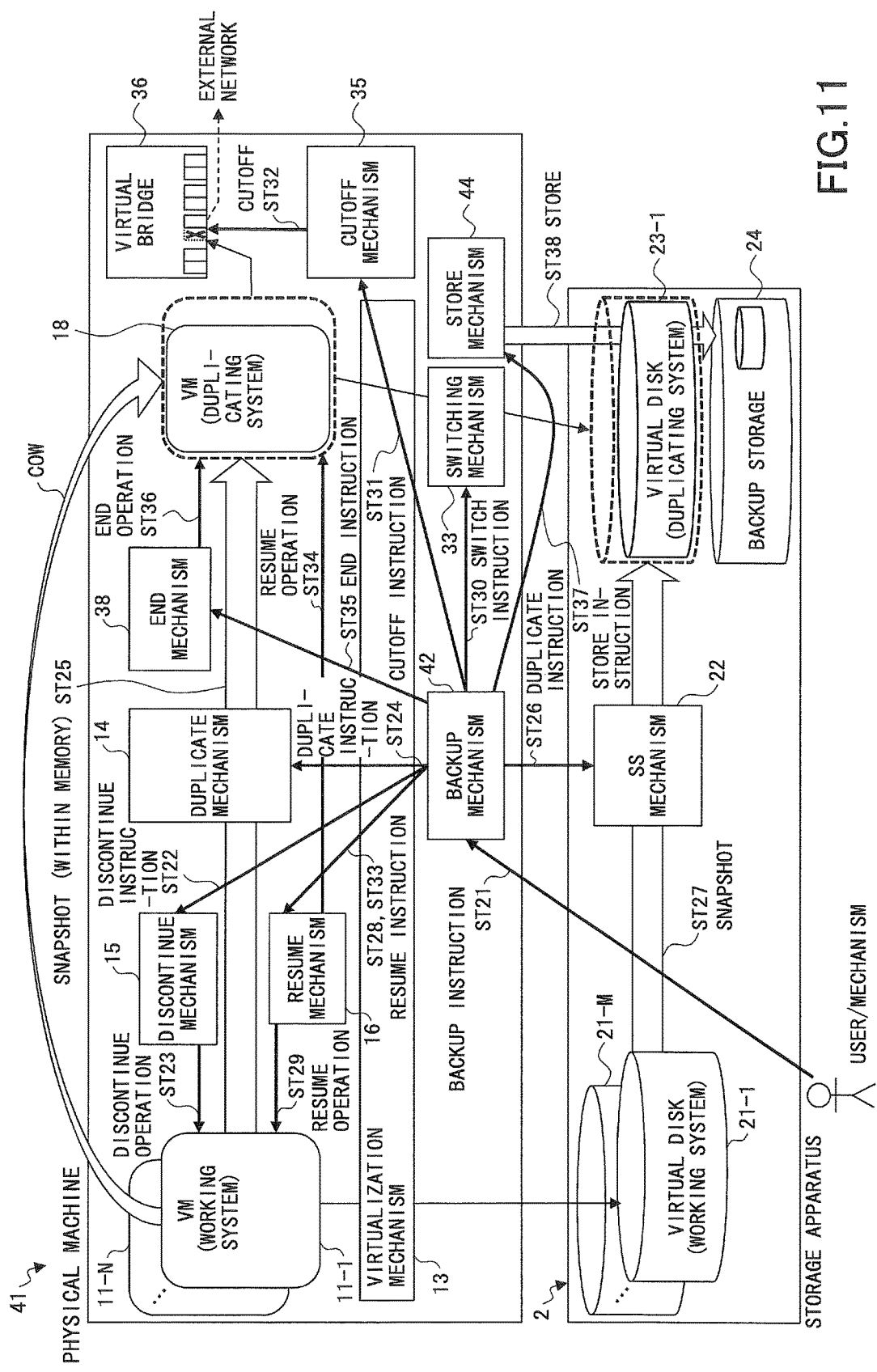
FIG. 11 is a block diagram illustrating the information processing apparatus in a third embodiment of the present invention.

FIG. 11 is a block diagram illustrating the information processing apparatus in a third embodiment of the present invention. In FIG. 11, those parts that are the same as those corresponding parts in FIGS. 1 and 5 are designated by the same reference numerals, and a description thereof will be omitted. A backup mechanism 42 basically includes the functions of the backup mechanism 12 illustrated in FIG. 1 and the functions of the backup mechanism 32 illustrated in FIG. 5. In addition, a store mechanism 44 is provided in place of the store mechanism 17 illustrated in FIG. 1, and the load mechanism 34 illustrated in FIG. 3 is not provided.

In this embodiment, after the switching of the virtual disk and the cutoff of the connection to the external network, the process of the duplicate system VM may be resumed and the process of the duplicate system VM may be ended in order to store only the virtual disk maintaining the application consistency, without having to once store the duplicate system VM and the virtual disk in the backup storage.

In FIG. 11, steps ST21 through ST29 correspond to steps ST1 through ST9 illustrated in FIG. 1, respectively. In addition, steps ST30 through ST36 correspond to steps ST13 through ST19 illustrated in FIG. 5, respectively. In this embodiment, the backup mechanism 42 does not output the load instruction in response to the restore instruction. Hence, the output of the switching instruction from the backup mechanism 42 in step ST30 is not triggered by the restore instruction but is triggered by the resume instruction output in step ST28, that is, by the start of the resume operation of the resume mechanism 16 with respect to the working system VM 11-1.

Steps ST37 and ST38 correspond to steps ST10 and ST11 illustrated in FIG. 1, respectively. When the backup mechanism 42 outputs the store instruction with respect to the store mechanism 44 in step ST37, the store mechanism 44 stores the contents of the virtual disk 23-1 maintaining the application consistency into the backup storage 24 in step ST38. In step ST 11, the store mechanism 17 illustrated in FIG. 1 stores the memory contents of the duplicate system VM 13 and the contents of the duplicate system disk 23-1 into the backup storage 24 in the single store operation. On the other hand, in the step ST38, the store mechanism 44 illustrated in FIG. 11 does not store the memory contents of the duplicate system VM 18 into the backup storage 24, and thus, the storage in step ST38 is different from the single store operation of step ST11.

FIG. 12 is a flow chart for explaining an example of an operation of the backup mechanism 44. Processes of steps S51 through S53, S70, S54 through S60, and S69 in FIG. 12 are similar to the processes of steps S1 through S11, and S13 illustrated in FIG. 4, and a description thereof will be omitted. In addition, processes of steps 361 through S68 in FIG. 12 are similar to processes of steps S36 through S43 illustrated in FIG. 10, and a description thereof will be omitted.

According to this embodiment, the first embodiment and the second embodiment are appropriately combined, in order not to perform the single store operation to store the duplicate system VM into the backup storage and not to perform the reloading of the duplicate system VM. Hence, the backup process may become relatively simple, and the backup process may foe completed in a relatively short time.

According to the embodiments described above, it may foe possible to appropriately provide a backup of the data of the VM while the working system VM is operating.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from, the spirit and scope of the invention.

What is claimed is:

1. A backup method to backup data of an information processing apparatus comprising a storage apparatus, and a physical machine that includes a processor and a memory, the backup method comprising:

discontinuing, by the processor, a process of a first virtual machine that operates within the physical machine according to a backup instruction that instructs backup of the first virtual machine;

duplicating, by the processor in a state in which the process of the first virtual machine is discontinued, data of a state of the first virtual machine in the memory as data of a state of a second virtual machine that operates within the physical machine and is a duplicate of the first virtual machine, and data of contents of a first virtual recording medium used by the first virtual machine in a second virtual recording medium within the storage apparatus;

resuming, by the processor, the discontinued process of the first virtual machine upon detecting completion of the duplicating;

switching, by the processor, a virtual recording medium at a connecting destination of the second virtual machine to the second virtual recording medium; and storing, by the processor after the resuming and the switching, the data of the state of the second virtual machine and the data of the contents of the second virtual recording medium used by the second virtual machine and stored in the storage apparatus into a backup storage within the storage apparatus in a single store operation,
wherein the discontinuing and the resuming maintain consistency of the data in the memory and the data in the storage apparatus.

2. The backup method as claimed in claim 1, further comprising:
storing, by the processor after the duplicating or the resuming, data of the memory and data of the storage apparatus into the backup storage within the storage apparatus in a single store operation.

3. The backup method as claimed in claim 2, further comprising:
cutting off, by the processor, a network connection of the second virtual machine after the resuming the discontinued process and the switching;
resuming, by the processor, a process of the second virtual machine after the cutting off; and
ending, by the processor, the process of the second virtual machine resumed by the resuming the process of the second virtual machine,
wherein the resuming the process of the second virtual machine and the ending are performed in succession to the storing after the duplicating or the resuming.

4. The backup method as claimed in claim 2, further comprising:
loading, by the processor in response to a load instruction, the data of the state of the second virtual machine and the contents of the second virtual machine from the backup storage to the memory and the storage apparatus, respectively;
cutting off, by the processor, the network connection of the second virtual machine after the loading;
resuming, by the processor, a process of the second virtual machine after the cutting off the network connection of the second virtual machine after the loading; and
ending, by the processor, the process of the second virtual machine resumed by the resuming the process of the second virtual machine.

5. The backup method as claimed in claim 1, wherein the duplicating duplicates the data of an operating state of the first virtual machine in the memory by a COW (Copy On Write).

6. The backup method as claimed in claim 1, further comprising:
cutting off, by the processor, a network connection of the second virtual machine after the resuming the discontinued process and the switching;
resuming, by the processor, a process of the second virtual machine after the cutting off; and
ending, by the processor, the process of the second virtual machine resumed by the resuming the process of the second virtual machine.

7. The backup method as claimed in claim 1, further comprising:
issuing, by the processor, a load instruction, a switch instruction, and a cutoff instruction in response to receiving a restore instruction;
loading, by the processor in response to the load instruction, the data of the state of the second virtual machine and the contents of the second virtual machine from the backup storage to the memory and the storage apparatus, respectively;
switching, by the processor in response to the switch instruction, the virtual recording medium at the connecting destination from the second virtual recording medium to the first virtual recording medium;
cutting off, by the processor in response to the cutoff instruction, the network connection of the second virtual machine after the loading;
resuming, by the processor, a process of the second virtual machine after the cutting off; and
ending, by the processor, the process of the second virtual machine resumed by the resuming the process of the second virtual machine.

8. An information processing apparatus comprising:
a physical machine including a processor, and a memory configured to store a program; and
a storage apparatus;
wherein the processor of the physical machine executes the program stored in the memory to perform a process including
discontinuing a process of a first virtual machine operating within the physical machine according to a backup instruction that instructs backup of the first virtual machine;
duplicating, in a state in which the process of the first virtual machine is discontinued, data of a state of the first virtual machine in the memory as data of a state of a second virtual machine that operates within the physical machine and is a duplicate of the first virtual machine, and data of contents of a first virtual recording medium used by the first virtual machine in a second virtual recording medium within the storage apparatus;
resuming the discontinued process of the first virtual machine upon detecting completion of the duplicating by the duplicating;
switching a virtual recording medium at a connecting destination of the second virtual machine to the second virtual recording medium; and
storing, after the resuming and the switching, the data of the state of the second virtual machine and the data of the contents of the second virtual recording medium used by the second virtual machine and stored in the storage apparatus into a backup storage within the storage apparatus in a single store operation,
wherein the discontinuing and the resuming maintain consistency of the data in the memory and the data in the storage apparatus.

9. The information processing apparatus as claimed in claim 8, wherein the processor of the physical machine performs the process further including
storing, after the duplicating or the resuming, data of the memory and data of the storage apparatus into the backup storage within the storage apparatus in a single store operation.

10. The information processing apparatus as claimed in claim 9, wherein the processor of the physical machine performs the process further including
cutting off a network connection of the second virtual machine after the resuming the discontinued process and the switching;
resuming a process of the second virtual machine after the cutting off; and
ending the process of the second virtual machine resumed by the resuming the process of the second virtual machine, wherein the resuming the process of the second virtual machine resumes the process of the second virtual machine and the ending ends the process of the second virtual machine, in succession to the storing after the duplicating or the resuming.

11. The information processing apparatus as claimed in claim 9, wherein the processor of the physical machine performs the process further including
loading, in response to a load instruction, the data of the state of the second virtual machine and the contents of the second virtual machine from the backup storage to the memory and the storage apparatus, respectively;
cutting off the network connection of the second virtual machine after the loading;
resuming a process of the second virtual machine after the cutting off the network connection of the second virtual machine after the loading; and
ending the process of the second virtual machine resumed by the resuming the process of the second virtual machine.

12. The information processing apparatus as claimed in claim 8, wherein the duplicating duplicates the data of an operating state of the first virtual machine in the memory by a COW (Copy On Write).

13. The information processing apparatus as claimed in claim 8, wherein the processor of the physical machine performs the process further including
cutting off a network connection of the second virtual machine after the resuming the discontinued process and the switching;
resuming a process of the second virtual machine after the cutting off; and
ending the process of the second virtual machine resumed by the resuming the process of the second virtual machine.

14. The information processing apparatus as claimed in claim 8, wherein the processor of the physical machine performs the process further including
issuing a load instruction, a switch instruction, and a cutoff instruction in response to receiving a restore instruction;
loading, in response to the load instruction, the data of the state of the second virtual machine and the contents of the second virtual machine from the backup storage to the memory and the storage apparatus, respectively;
switching, in response to the switch instruction, the virtual recording medium at the connecting destination from the second virtual recording medium to the first virtual recording medium;
cutting off, in response to the cutoff instruction, the network connection of the second virtual machine after the loading;
resuming a process of the second virtual machine after the cutting off; and
ending the process of the second virtual machine resumed by the resuming the process of the second virtual machine.

15. A non-transitory computer-readable storage medium having stored therein a program for causing a computer to execute a backup process comprising:
discontinuing a process of a first virtual machine operating within a physical machine according to a backup instruction that instructs backup of the first virtual machine;
duplicating, in a state in which the process of the first virtual machine is discontinued, data of a state of the first virtual machine in a memory of the physical machine, as data of a state of a second virtual machine that operates within the physical machine and is a duplicate of the first virtual machine, and data of contents of a first virtual recording medium used by the first virtual machine in a second virtual recording medium within a storage apparatus;
resuming the discontinued process of the first virtual machine upon detecting completion of the duplicating;
switching a virtual recording medium at a connecting destination of the second virtual machine to the second virtual recording medium; and
storing, after the resuming and the switching, the data of the state of the second virtual machine and the data of the contents of the second virtual recording medium used by the second virtual machine and stored in the storage apparatus into a backup storage within the storage apparatus in a single store operation,
wherein the discontinuing and the resuming maintain consistency of the data in the memory and the data in the storage apparatus.

16. The non-transitory computer-readable storage medium as claimed in claim 15, wherein the backup process further comprises:
storing, after the duplicating or the resuming, data of the memory and data of the storage apparatus into the backup storage within the storage apparatus in a single store operation.

17. The non-transitory computer-readable storage medium as claimed in claim 16, wherein the backup process further comprises:
cutting off a network connection of the second virtual machine after the resuming the discontinued process and the switching;
resuming a process of the second virtual machine after the cutting off; and
ending the process of the second virtual machine resumed by the resuming the process of the second virtual machine,
wherein the resuming the process of the second virtual machine and the ending are performed in succession to the storing after the duplicating or the resuming.

18. The non-transitory computer-readable storage medium as claimed in claim 16, wherein the backup process further comprises:
loading, in response to a load instruction, the data of the state of the second virtual machine and the contents of the second virtual machine from the backup storage to the memory and the storage apparatus, respectively;
cutting off the network connection of the second virtual machine after the loading;
resuming a process of the second virtual machine after the cutting off the network connection of the second virtual machine after the loading; and
ending the process of the second virtual machine resumed by the resuming the process of the second virtual machine.

19. The non-transitory computer-readable storage medium as claimed in claim 15, wherein the duplicating duplicates the data of an operating state of the first virtual machine in the memory by a COW (Copy On Write).

20. The non-transitory computer-readable storage medium as claimed in claim 15, wherein the backup process further comprises:
cutting off a network connection of the second virtual machine after the resuming the discontinued process and the switching;

resuming a process of the second virtual machine after the cutting off; and ending the process of the second virtual machine resumed by the resuming the process of the second virtual machine.

21. The non-transitory computer-readable storage medium as claimed in claim 15, wherein the backup process further comprises:

issuing a load instruction, a switch instruction, and a cutoff instruction in response to receiving a restore instruction;

loading, in response to the load instruction, the data of the state of the second virtual machine and the contents of the second virtual machine from the backup storage to the memory and the storage apparatus, respectively;

switching, in response to the switch instruction, the virtual recording medium at the connecting destination from the second virtual recording medium to the first virtual recording medium;

cutting off, in response to the cutoff instruction, the network connection of the second virtual machine after the loading;

resuming a process of the second virtual machine after the cutting off; and ending the process of the second virtual machine resumed by the resuming the process of the second virtual machine.

\* \* \* \* \*